July 22, 1958 — H. C. VANCE — 2,843,884
SEAT CONSTRUCTION FOR FOLDABLE BLEACHERS
Filed June 1, 1953 — 2 Sheets-Sheet 1
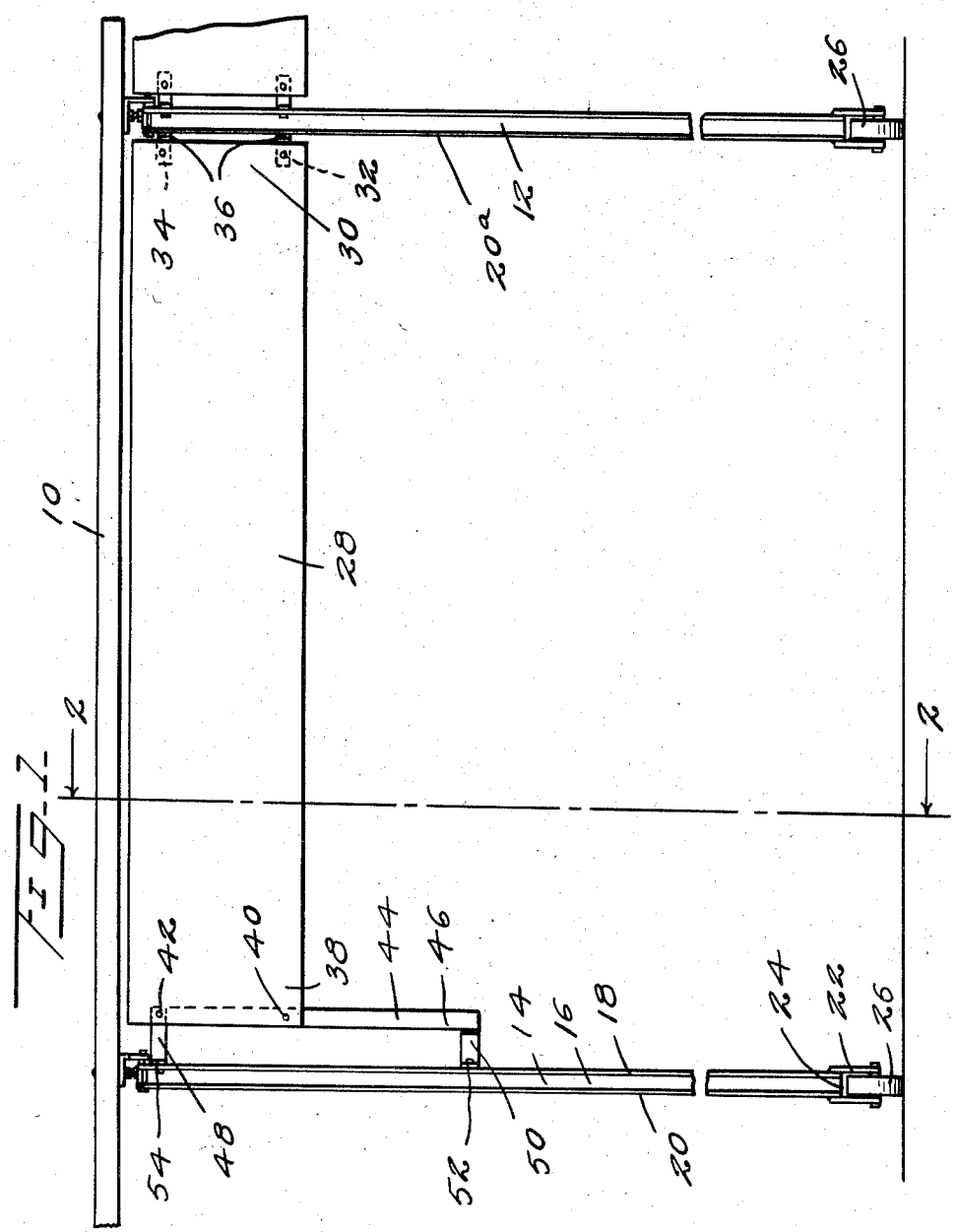
INVENTOR
H.C.Vance
BY Kimmel & Crowell
ATTORNEYS July 22, 1958 H. C. VANCE 2,843,884
SEAT CONSTRUCTION FOR FOLDABLE BLEACHERS
Filed June 1, 1953 2 Sheets-Sheet 2
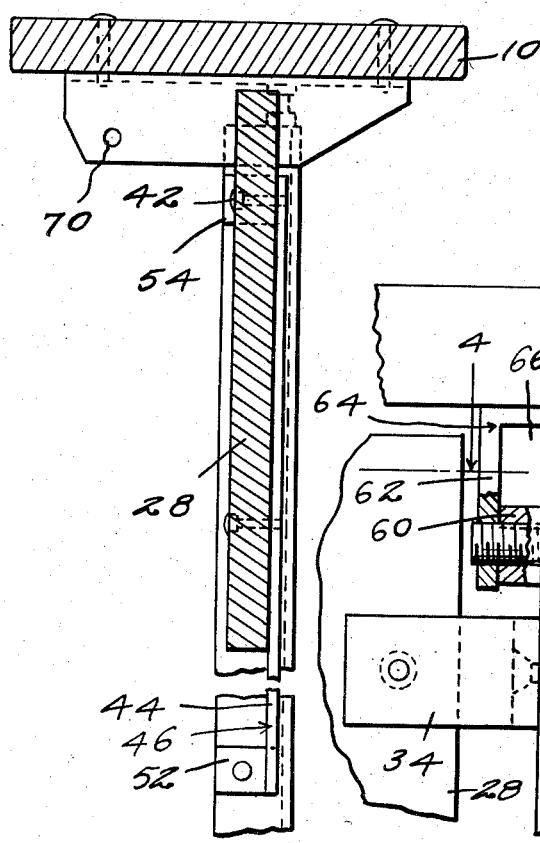
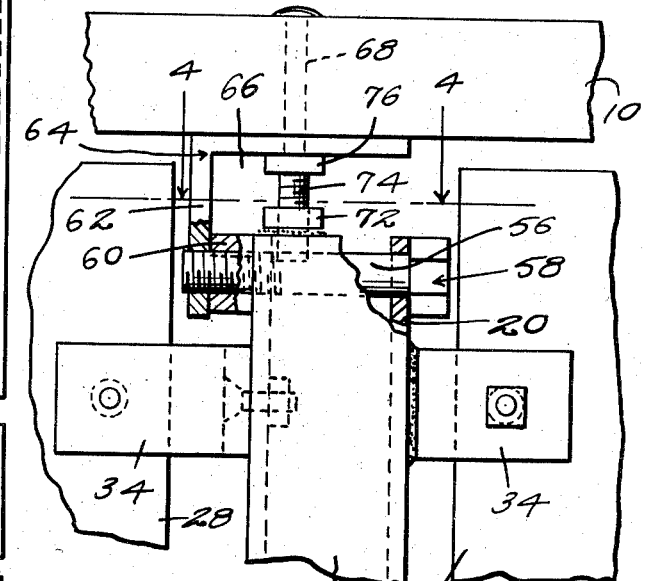
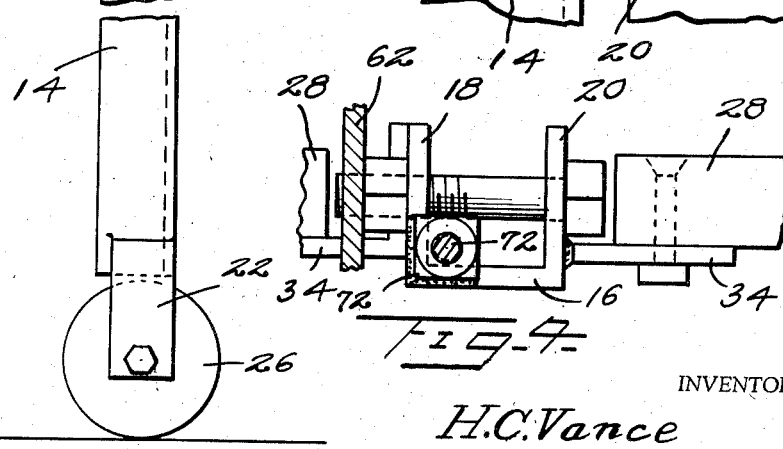
INVENTOR
*H.C. Vance*
BY *Kimmel & Crowell*
ATTORNEYS United States Patent Office 2,843,884
Patented July 22, 1958

2,843,884

SEAT CONSTRUCTION FOR FOLDABLE BLEACHERS

Harold Clayton Vance, Champaign, Ill.

Application June 1, 1953, Serial No. 358,826

1 Claim. (Cl. 20—1.126)

This invention relates to improvements in foldable bleachers or grandstands of the type shown in Patents 2,147,564 and 2,205,624, and has for a primary object to provide means for firmly mounting the seats of such bleachers in a manner to prevent rocking movement of the seats when the bleachers are in extended or open position.

In such foldable bleachers or grandstands the seats are pivotally mounted on the upper ends of the posts for movement from horizontally disposed open or extended positions to substantially vertically disposed closed positions. The seat boards form a continuous sloping face when in folded positions.

Another important object of this invention is to provide means for rigidifying the bleacher construction and particularly for stabilizing and rigidifying the seats in their open positions.

Another object of this invention is to provide vertical filler boards that are disposed in the center of all seats to add rigidity to the seats, and to provide, in association with the filler boards, adjustable rests for the seats to prevent rocking movement of the seats in their open or horizontally disposed positions.

A further object of this invention is to provide means for mounting the filler boards on the posts to enclose the entire understructure from front view and to position the filler boards directly under the structures of the seats and in a manner so that the filler boards do not interfere with the leg room under the seats and permit normal positions of feet drawn back under the seats.

A further object of this invention is to provide a compact and inexpensive means for stabilizing the supporting structure of the bleachers and for stabilizing the seats in particular.

These and ancillary objects and structural features of merit are attained by this invention, the preferred embodiment of which is set forth in the following description and is illustrated in the accompanying drawings, wherein:

Figure 1 is a front elevational view of a portion of a foldable bleacher showing in elevation the vertically disposed filler board and the adjustable rest for the horizontally disposed or open seat;

Figure 2 is a vertical cross-sectional view taken on line 2—2 of Figure 1;

Figure 3 is a detailed rear elevational view of the upper end of one of the posts showing in detail the adjustable rest; and Figure 4 is a horizontal sectional view taken on line 4—4 of Figure 3.

Referring now more particularly to the accompanying drawings, the seat board 10 is pivotally mounted on the upper ends of the posts 12 and 14 for pivotal movement from a horizontally disposed position, as shown in Figure 1, to a collapsed position wherein the seat folds into angular position. The seats are moved to such angular position as the supporting posts 12 and 14 are moved rearwardly relative to a supporting wall. The supporting posts nest together and responsive to the rearward movement of the posts, the seats, by means of any suitable linkage system (not shown), are moved to closed positions where they form a sloping continuous wall.

The posts are channel-shaped and identically formed and constructed so that, with respect to the post 14 the same includes a web 16 and parallel legs or flanges 18 and 20. The lower end of the post is suitably secured in a channel-shaped roller support or member 22. The lower end rests on and is secured to a flange 24 that extends between the flanges and web of the channel member 22. A roller 26 is rotatably carried by the lower ends of the flanges of the channel member 22.

Disposed vertically below the seat board 10 is a filler board 28. As shown in Figure 2, the filler board 28 is positioned vertically below the seat board and extends along the longitudinal center line thereof. The seat board is attached at each end to the posts 12 and 14. As shown in Figure 1, the end 30 of the filler board is bolted to lugs 32 and 34 that project beyond the edge of the end 30 and are welded as at 36 to the flange 20a of the post 12. The end 38 of the filler board 28 is bolted, as at 40 and 42, to the vertical portion 44 of a bracket 46. Arms 48 and 50 project laterally from the ends of the vertical portion 46 and terminate in offset lateral ends 52 and 54 which are bolted to the flanges 18 of the post 14.

As shown more particularly in Figures 3 and 4, the upper ends of the posts pivotally support the seat board 10. To mount the seat board, as shown in Figures 3 and 4, the upper ends of the flanges 18 and 20 are provided with openings to receive the shank 56 of a bolt 58. The head of the bolt bears against the flange 20 and a nut 60 is threaded on the end of the bolt and bears against the flange 18.

The vertical flange 62 of an angle iron 64 is mounted on the extending end of the bolt 58 and the horizontal flange 66 is secured by pins 68 to the underside of the seat board 10. The vertical flange 62, as shown in Figure 2, is provided with an opening 70 to receive a section of the folding linkage (not shown).

A nut 72 is welded to the upper end of the posts 14 and 12. As shown in Figures 3 and 4, the nut 72 is welded to the upper end of the flange 18 and web 16 at the juncture thereof. The nut carries a screw 74 which is adjustable vertically in the nut to locate the head 76 thereof at the desired distance above the end of the post. The underside of the flange 66 of the angle iron 64 rests on the head 76 which serves to stabilize the seat when it is in its horizontally disposed or open position, and to prevent rocking or wobbling movement of the seat in such position. The screw is adjustable to compensate for play of the rotating bolt 56 which serves as a pivot for the seat.

It can be seen that the filler board 28 will be retained in its vertical position by the end brackets that secure it to the posts 12 and 14. A number of seats (not shown) will be disposed in front of the seat 10 and supported in an identical manner, the seat immediately in front of the seat 10 when in its open position extending at right angles from the filler board 28. Thus, the filler boards will completely enclose the understructure from the front of the flanges.

In addition the filler boards add rigidity to the seat boards and make the complete bleacher or stand stronger and more substantial both in construction and in appearance. The seats will be firm and rigid in open positions and will rest on the adjustable screws 74.

While the preferred embodiment of this invention has been described herein and illustrated in the accompanying drawings, such is by way of example only since other forms may be realized as come within the scope of the appended claim.

What is claimed is:

In a foldable bleacher construction a framework including vertical channel shaped posts and collapsible seats pivoted to the tops of said posts, a filler board disposed in edgewise position beneath each seat, said filler boards each having the upper edge thereof spaced beneath its respective seat, a pair of laterally projecting lugs fixed to one post, means securing one end of said board to said lugs on said one post, a vertical bracket arm, means securing said bracket arm to the other end of said board, means supporting said bracket arm in laterally disposed position on an adjacent post, and adjustable stop means carried by the upper ends of said posts for limiting the turning of said seat from a collapsed position to an extended seating position, said filler boards serving as bracing members for said framework and simultaneously serving to prevent the legs of the users from slipping between the seat boards rearwardly.

References Cited in the file of this patent

UNITED STATES PATENTS

| | | |
|---|---|---|
| 1,926,859 | Reiss | Sept. 12, 1933 |
| 2,098,485 | Carlson | Nov. 9, 1937 |
| 2,183,056 | Albach et al. | Dec. 12, 1939 |
| 2,205,624 | Horn | June 25, 1940 |